United States Patent [19]

Hehl

[11] Patent Number: 4,678,572
[45] Date of Patent: Jul. 7, 1987

[54] VENTED COVER ASSEMBLY WITH FILTER INSERT FOR FLUID RESERVOIR

[76] Inventor: Karl Hehl, Arthur-Hehl-Strasse 32, 7298 Lossburg 1, Fed. Rep. of Germany

[21] Appl. No.: 921,334

[22] Filed: Oct. 21, 1986

Related U.S. Application Data

[63] Continuation of Ser. No. 823,470, Jan. 28, 1986, abandoned, which is a continuation of Ser. No. 701,624, Feb. 14, 1985, abandoned.

[30] Foreign Application Priority Data

Feb. 14, 1984 [DE] Fed. Rep. of Germany ....... 3405105

[51] Int. Cl.⁴ ............................................. B01D 27/08
[52] U.S. Cl. ..................................... 210/232; 210/436
[58] Field of Search ................. 55/504, 505, 506, 510, 55/511; 210/120, 168, 188, 232, 237, 238, 416.5, 436

[56] References Cited

U.S. PATENT DOCUMENTS

| | | | |
|---|---|---|---|
| 2,418,777 | 4/1947 | Le Clair | 210/436 |
| 2,904,182 | 9/1959 | Baumann | 210/436 |
| 2,932,400 | 4/1960 | Scavuzzo | 210/436 |
| 3,389,799 | 6/1968 | Thrasher, Jr. | 210/436 |
| 3,503,509 | 3/1970 | Kudlaty | 210/436 |
| 4,454,031 | 6/1984 | Schier | 210/120 |
| 4,529,512 | 7/1985 | Williamson et al. | 210/436 |
| 4,588,503 | 5/1986 | Sugiura | 210/232 |
| 4,617,117 | 10/1986 | Messinger et al. | 210/232 |

Primary Examiner—Richard V. Fisher
Assistant Examiner—Wanda L. Millard
Attorney, Agent, or Firm—Joseph A. Geiger

[57] ABSTRACT

A vented cover assembly for a hydraulic fluid reservoir comprising a socket ring mountable in a large opening of the reservoir wall, a filter casing attachable to the socket ring by means of a first bayonet lock, and a cap attachable to the filter casing by means of a second bayonet lock, following insertion of a filter cartridge into the filter casing. The second bayonet lock has a higher release resistance than the first bayonet lock, for the removal of the filter casing, filter cartridge and cap from the socket ring as a closed filter subassembly. Air flowing into or out of the fluid reservoir is strained by the filter cartridge.

15 Claims, 12 Drawing Figures

VENTED COVER ASSEMBLY WITH FILTER INSERT FOR FLUID RESERVOIR

BACKGROUND OF THE INVENTION

1. Field of the Invention

The present invention relates to vented container covers and, more particularly, to a cover assembly designed for the filtered venting of a container, such as, for example, the reservoir holding the drive fluid of a hydraulically operated production machine.

2. Description of the Prior Art

In order to protect the hydraulic drive fluid of a production machine from contamination by ambient particulate matter, it may be desirable to contain the hydraulic fluid in a closed, vented reservoir. An optimal degree of protection is obtained with a fluid reservoir which includes, in its vent passage, an air strainer in the form of an interchangeable filter cartridge.

The use of an air filter in conjunction with a vent opening on a hydraulic fluid container is known from the prior art. A known device of this type features a vent opening in the reservoir wall, a flanged filter casing screwed to the outer side of the wall, and a removable threaded cover on the distal end of the filter casing.

SUMMARY OF THE INVENTION

Underlying the present invention is the primary objective of suggesting an improved cover assembly for a hydraulic fluid reservoir which, while covering an opening which is large enough to serve as a fill and/or discharge opening for the hydraulic fluid, includes a removable filter casing with vent openings and an interchangeable filter cartridge in the venting air flow. The constituent parts of the assembly are to be injection-molded parts which are easy to assemble, the outer cover and filter casing being readily removable, without the need for special tools.

The present invention proposes to attain this objective by suggesting a vented cover assembly for a fluid reservoir which comprises a socket ring which is mountable in a large circular opening in a wall of the reservoir, a filter casing which is releasably attachable to the socket ring by means of a first bayonet lock, and a cap which is releasably attachable to the filter casing by means of a second bayonet lock, thereby enclosing a filter cartridge between the filter casing and the cap.

The cap, by retaining the filter cartridge inside the filter casing, also serves as an axial abutment member for the second bayonet lock, thereby advantageously preventing the closing of the cap in the absence of a filter cartridge inside the filter casing. The filter cartridge is preferably an annular filter cartridge which is clamped between opposing circular sealing lips of the filter casing and cap, to provide the necessary axial preload for the second bayonet lock.

The two bayonet locks have very similar socket members and insertion members, for savings in tooling costs, and both bayonet locks are right-handed, being engageable with a clockwise angular movement.

In a preferred embodiment of the invention, the filter casing, the filter cartridge and the cap are removable from the socket ring as a filter subassembly, in a release movement in which the first bayonet lock is disengaged, while the second bayonet lock between the filter casing and the cap remains engaged.

The invention further suggests for the filter subassembly to be removable by applying the release torque to the cap and for the second bayonet lock to have a higher release resistance. The latter is obtained by either a higher axial preload or a higher detent ridge as part of the second bayonet lock.

In the suggested configuration of the cover assembly, the major portion of the assembly is located on the inside of the reservoir wall, for reduced space requirements on the outside and better protection of the assembly against accidental damage.

The means for mounting the socket ring to the opening in the reservoir wall is so arranged that the mounting fasteners are inaccessible, when the filter subassembly is in place. The thickness of the reservoir wall may vary over a range of different gauges.

Several peripheral vent openings in the cap and a large central opening on the inner side of the filter casing communicate with opposite sides of the wall of the filter cartridge to provide a large minimally restricted venting passage while filtering the air.

The cap, the filter casing and the socket ring are preferably injection-molded plastic parts of rotationally symmetric metric shape. None of these parts require any machining operations.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented in the various figures as follows.

DESCRIPTION OF THE PREFERRED EMBODIMENT

Figure 12:
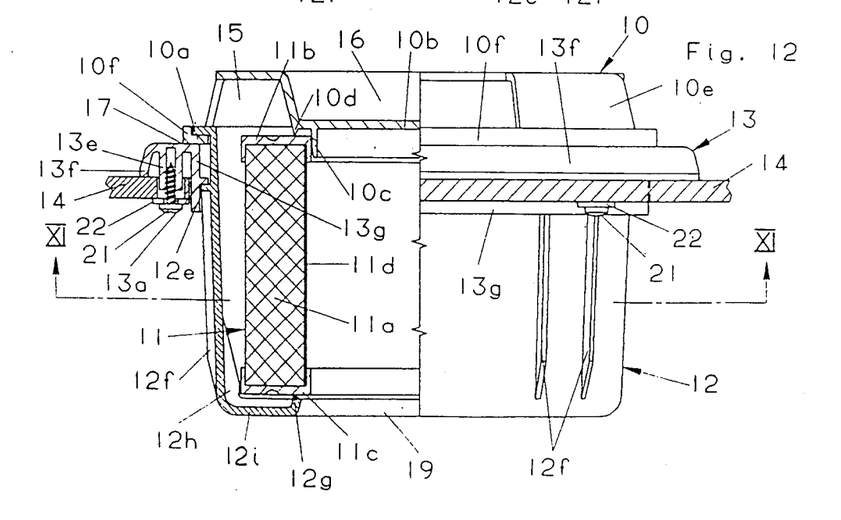
FIG. 12 shows the cover assembly of the invention partially in a side view and partially as sectioned along line XII—XII of FIG. 11.

Hydraulic drive systems for injection molding machines and other production machines require a reservoir for the hydraulic drive fluid. Such a fluid reservoir is represented in FIGS. 1 and 12 by a portion of a sheet metal wall 14.

The wall 14 has a circular opening 23 which is located above the highest fluid level in the reservoir, serving as a fluid fill and/or fluid discharge opening which is closable by the cover assembly of the invention.

Figure 1:
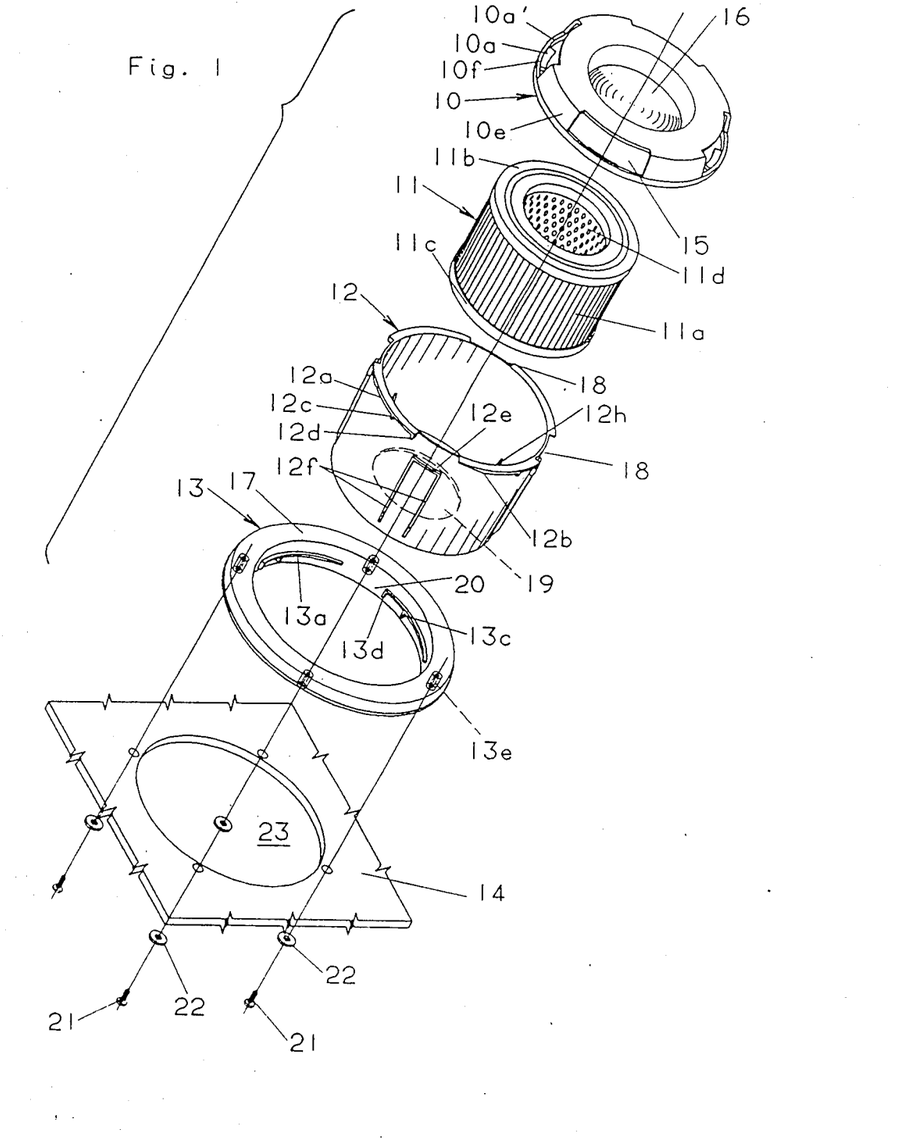
FIG. 1 shows, in an exploded perspective view, the constituent parts of a vented cover assembly embodying the present invention.

As can be seen in FIG. 1, the cover assembly comprises four major constituent parts: a socket ring 13, a filter casing 12, a filter cartridge 11, and a cap 10. In the assembled and installed condition, illustrated in FIG.

12, the socket ring 13 is attached to the outer side of the wall 14 in a centered relationship with the opening 23, serving as a support for the pot-shaped filter casing 12. The annular filter cartridge 11 is enclosed within the filter casing 12 and held in place by means of the cap 10 which is removably attached to the filter casing 12.

As the fluid level rises and falls inside the fluid reservoir, a corresponding volume of air is expelled or drawn in through the cover assembly, where the venting air must pass through the filter cartridge 11, as will be explained further below.

The four constituent parts of the cover assembly are all parts of rotational symmetry, having a common axis which is oriented at right angles to the plane of the reservoir wall 14. The cap 10, the filter casing 12 and the socket ring 13 are preferably injection-molded plastic parts.

FIG. 12 also shows that only the socket ring 13 and cap 10 are located on the outer side of the wall 14, and that both are relatively narrow in the axial sense, thereby minimizing the space requirements of the cover assembly on the outside of the reservoir. The major portion of the cover assembly is located on the inside of the wall 14, where it is better protected against accidental damage.

The socket ring 13 is attached to the wall 14 by means of a four self-tapping screws 21 engaging four eye sockets 13e of the socket ring 13 from the inside of the wall 14. The eye sockets 13e extend axially inwardly into four positioning bores in the wall 14 which are located a small radial distance from the edge of the opening 23. Washers 22 under the screws 21 bear against the inner side of the wall 14.

This arrangement makes it possible to attach the cover assembly to reservoir walls of different sheet metal gauge. And, since the socket ring 13 is to remain in place, when the other parts of the cover assembly are removed for access to the circular opening 23, the screws 21 are inaccessible in the installed condition of the cover assembly.

Figure 9:
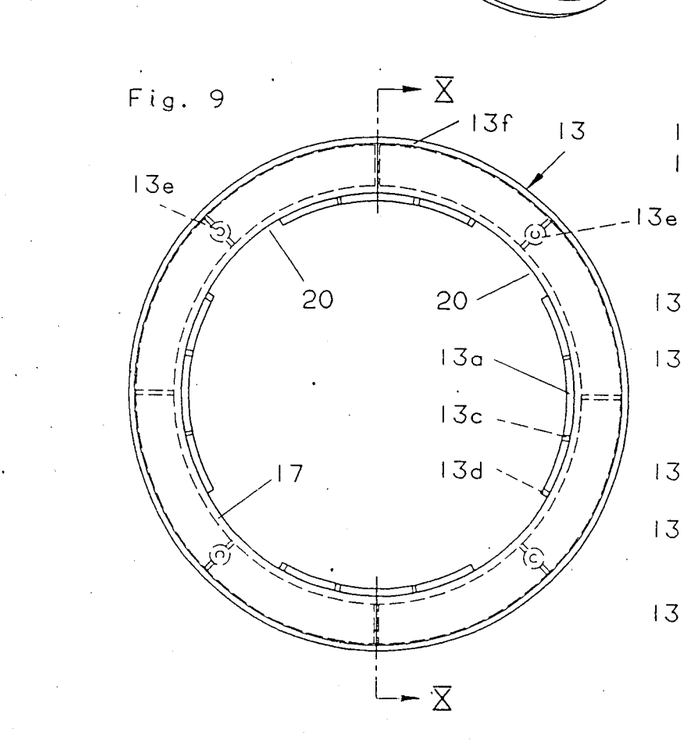

The socket ring 13 has a channel-shaped cross section defined by a short tubular portion 13g, the axially outer extremity of which is adjoined by an angular peripheral flange 13f with a planar wall portion and a conical peripheral wall portion. The four eye sockets 13e extend axially inwardly from the planar wall portion and are braced by radial ribs (FIG. 9).

Figure 10:
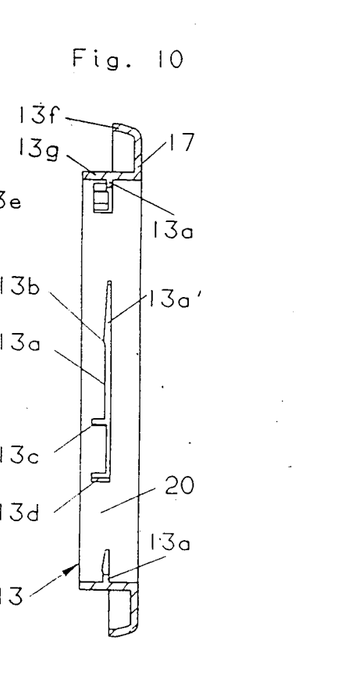
Figure 11:
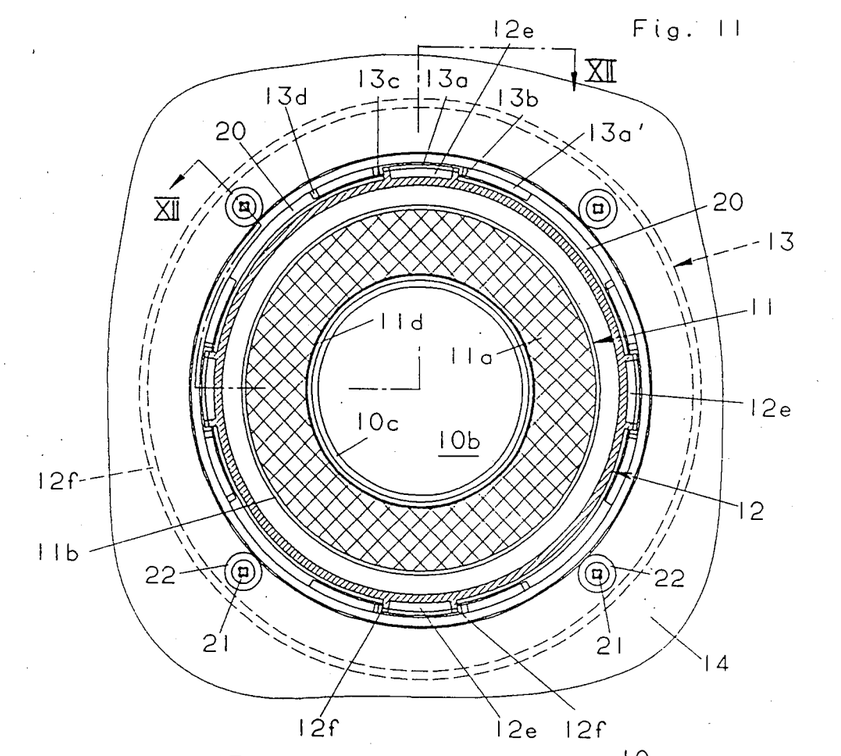
FIG. 11 shows the cover assembly of the invention as sectioned along line XI—XI of FIG. 12 and viewed from the inside of a wall to which it is attached.

The tubular portion 13g of the socket ring 13 reaches inwardly through the opening 23. It carries the filter casing 12 which is releasably attached to the socket ring 13 by means of a first bayonet lock. This bayonet lock configuration includes four angularly regularly spaced socket members 13a which protrude from the inner wall of the tubular portion 13g of the socket ring 13 (see FIGS. 8-10) and cooperate with four insertion members 12e on the cylindrical outer wall of the filter casing 12.

Figure 8:
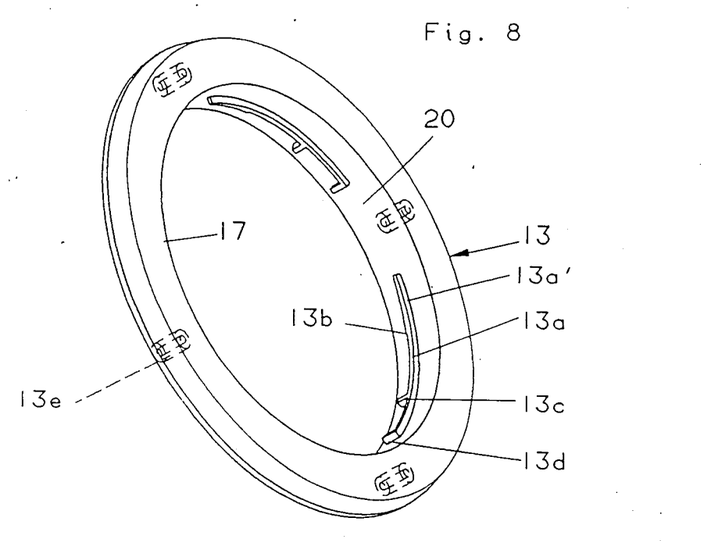
FIGS. 8–10 show a socket ring for the cover assembly of the invention in a perspective view, a plan view, and a sectional side view, respectively, the section for FIG. 10 being taken along line X—X of FIG. 9.

The angular extent and location of the insertion members 12e on the filter casing 12 is such that they are movable axially past the socket members 13a of the socket ring 13, when angularly aligned with the insertion gaps 20 between the socket members 13a (FIG. 8). The filter casing 12 is thereby insertable into the socket ring 13 from the outside, despite the fact that its insertion members 12e form a radial overlap with the socket members 13a of the socket ring 13.

The depth of insertion of the filter casing 12 into the socket ring 13 is limited by a radially outwardly protruding rim structure on the filter casing 12 which has nose-shaped stops 12d and 12c engaging the planar outer face 17 of the socket ring 13. In this axial abutment position, the insertion members 12e of the filter casing 12 are located just inside the socket members 13a of the socket ring 13, so that, when the filter casing 12 is moved angularly, its insertion members 12e engage the socket members 13a of the socket ring 13 from the inside, while its stops 12d and 12 c engage the outer face 17 of the socket ring 13 from the outside. The result is an axially captive engagement between the filter casing 12 and the socket ring 13.

In order to facilitate the axial insertion of the filter casing 12 into the socket ring 13, the extremities of its circumferentially oriented insertion members 12e are adjoined on their axially inner sides by pairs of longitudinal guide ribs 12f extending axially to the vicinity of the inner extremity of the filter casing 12.

While the insertion members 12e on the filter casing 12 have the shape of simple peripheral ribs, the socket members 13a on the tubular portion 13g of the socket ring 13 have a special shape which includes a ramp portion 13a' and a detent ridge 13b leading to an arcuate portion of a length which corresponds to the arcuate length of the insertion members 12e.

As a socket member 13a moves angularly over the ramp portion 13a' and past the detent ridge 13b, its movement is arrested by an engagement stop 13c. A separate released stop 13d, arranged at an angular distance from the engagement stop 13c, cooperates with one of the guide ribs 12f of the filter casing 12 in the angular release movement, in order to align the insertion members 12e of the filter casing 12 with the insertion gaps 20 of the socket ring 13 for the axial withdrawal of the filter casing 12 from the socket ring 13.

Figure 5:
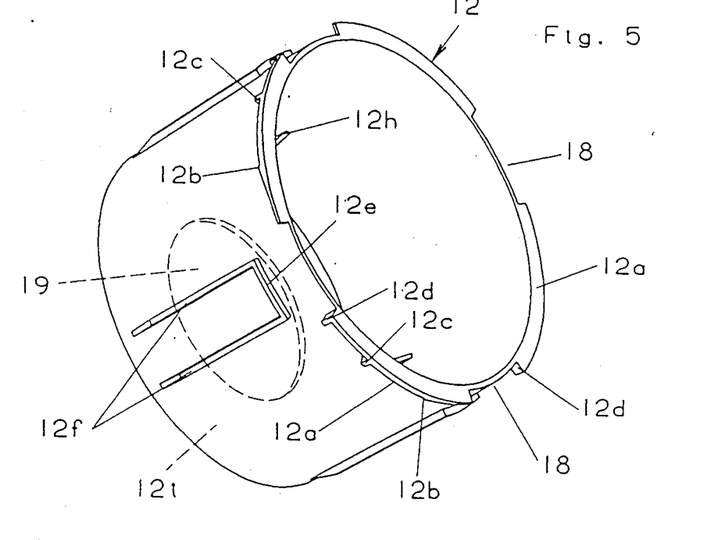
FIGS. 5–7 show a filter casing for the cover assembly of the invention in a perspective view, a plan view, and a side view, respectively.
Figures 6, 7:
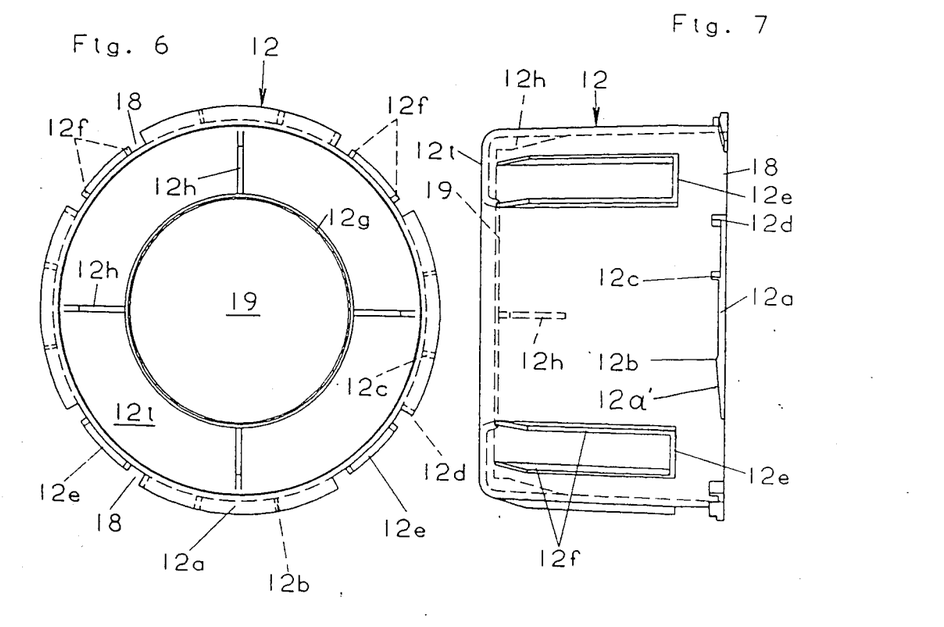

The axially captive engagement between the socket ring 13 and the filter casing 12, as created by the socket members 13a of the socket ring 13, in cooperation with the insertion members 12c and the opposing stops 12d and 12c of the filter casing 12, is given a limited degree of axial flexibility by the fact that the insertion members 12e are arranged angularly offset from the opposing stops 12d and 12c on the rim of the filter casing 12 (FIGS. 5-7), so that the axial distance between the insertion members 12e and the stops 12d and 12e can increase slightly, under forcible deformation of the casing wall.

This axial flexibility of the bayonet lock has the advantage of producing a controlled, relatively gentle frictional pressure between the cooperating surfaces of the bayonet lock configuration. The four elongated arcuate socket members 13a on the tubular portion 13g of the socket ring 13 also serve to center the filter casing 12 by cooperating with the cylindrical outer wall of the filter casing 12.

The cap 10 is releasably attached to the outer rim of the filter casing 12 by means of a second bayonet lock which is very similar to the above-described first bayonet lock between the filter casing 12 and the socket ring 13 and likewise right-handed.

As part of the second bayonet lock configuration, the rim of the filter casing 12 forms four socket members 12a which cooperate with four insertion members 10a of the cap 10. The second bayonet lock configuration differs from the first one, inasmuch as the cap 10 is inserted over the filter casing 12, meaning that the cap 10 has radially inwardly protruding insertion members 10a—as distinct from the radially outwardly protruding insertion members 12e of the filter casing 12—and that the socket members 12a of the filter casing 12 are radially outwardly protruding formations on the casing wall.

In their general shape and in their function, the socket members 12a of the filter casing 12 correspond to the socket members 13a of the socket ring 13. Accordingly, each socket member 12a has a ramp portion 12a' and a detent ridge 12b, as well as an engagement stop 12c and a release stop 12d. The release stops 12d border four insertion gaps 18 in the rim of the filter casing 12. It should be noted that the inner end faces of the engagement stops 12c and release stops 12d also serve as axial abutment members against the outer face 17 of the socket ring 13, in conjunction with the first bayonet lock, as described further above.

Figure 2:
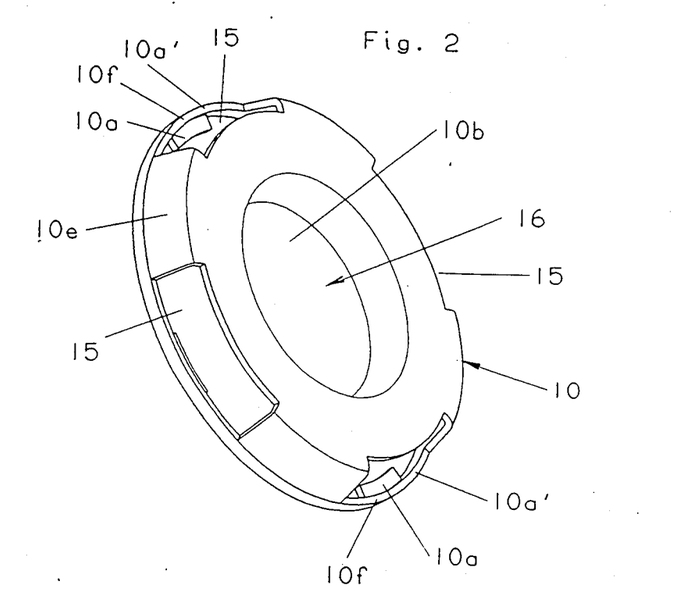
FIGS. 2–4 show a cap for the cover assembly of the invention in a perspective view, a plan view, and a side view, respectively.
Figures 3, 4:
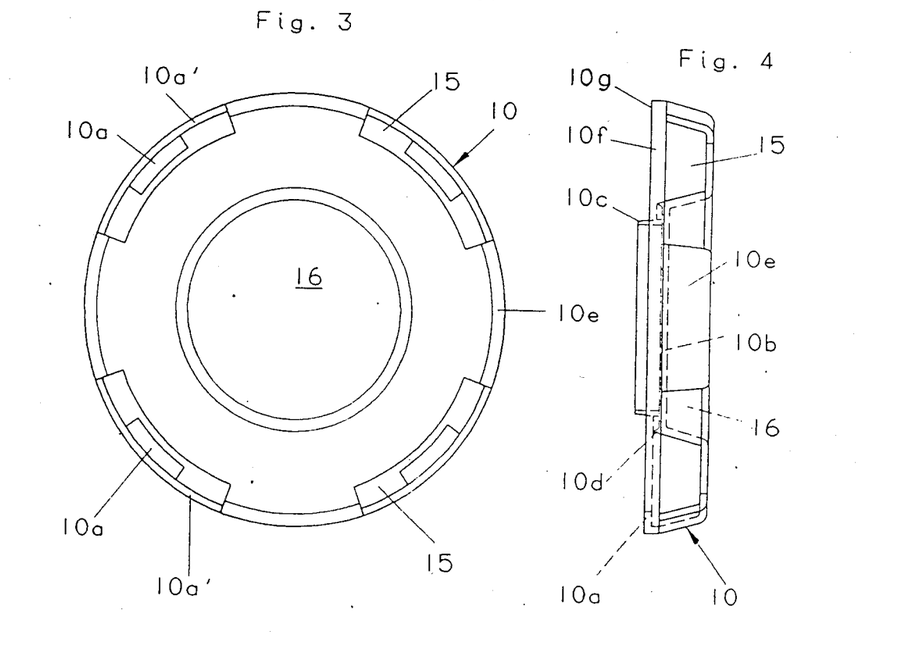

The insertion members 10a of the cap 10 are arranged on the edge of a short cylindrical outer wall portion of the cap, being flush with a planar end face 10g of that wall portion (FIG. 4). Adjoining the cylindrical outer wall portion of the cap 10 is a tapered wall portion 10e which leads to a planar end wall with a central recess 16. In the area of each insertion member 10a, a sector of the tapered wall portion 10e is cut away to produce a vent opening 15, leaving a rim bridge 10f as part of the cylindrical outer wall portion to carry the insertion member 10a (FIG. 2).

While the insertion members 10a of the cap 10 and the socket members 12a of the filter casing 12 provide an axial abutment in one direction, i.e. in the direction in which they prevent removal of the cap 10, the opposite axial abutment necessary for axial captivity is provided either by the filter cartridge 11 alone or by both the filter cartridge 11 and the outer face 17 of the socket ring 13 (FIG. 12).

The present invention also offers the advantageous feature of making it possible to install and remove the filter casing 12 with the cap 10 and enclosed filter cartridge 11 as a filter subassembly. In this subassembly, the filter cartridge 11 forms a part of the second axial abutment for the second bayonet lock by exerting an axial preload against the cap 10. In order to maintain this preload, the filter wall 11a of the filter cartridge 11 is supported by means of a perforated supporting sleeve 11d and fitted with identical end discs 11b and 11c of compressible high-polymer plastic.

The inner end disc 11c of the filter cartridge 11 is engaged by a circular sealing lip 12g on the upended peripheral edge of an interior flange 12i at the inner end of the filter casing 12, and its outer end disc 11b is similarly engaged by a circular sealing lip 10d on the recessed wall portion 10b of the cap 10. Inwardly adjacent to the sealing lip 10d is a centering collar 10c which extends from the recessed wall portion 10b into engagement with the interior diameter of the outer end disc 11b. At the other end, the filter cartridge 11 is centered in the filter casing 12 by means of angular positioning ribs 12h which are arranged in the bottom portion of the filter casing 12.

Following the insertion of the filter cartridge 11 into the filter casing 12, the cap 10 is closed against the filter casing 12 by first aligning the insertion members 10a of the cap 10 with the insertion gaps 18 on the rim of the filter casing 12 and then axially approaching the cap 10 against the filter casing 12, until the insertion members 10a are in an axial engagement position in which they are angularly movable behind the socket members 12a of the filter casing 12 in a clockwise engagement movement.

The axial length of the filter cartridge 11 is such that, in said axial engagement position, the sealing lip 10d of the cap 10 and the sealing lip 12g of the filter casing 12 "bite" into the outer and inner end discs 11b and 11c of the filter cartridge 11.

The axial reaction force resulting from this "bite" creates a predetermined frictional preload between the engaged insertion members 10a of the cap 10 and the socket members 12a of the filter casing 12. However, as in the case of the first bayonet lock, this frictional preload is limited by the axial flexibility of the cooperating parts, in this case, the combined flexibilities of the rim bridges 10f, which carry the insertion members 10a, and the rim portions of the filter casing 12 which serve as the socket members 12a.

By using the filter cartridge 11 as an axial abutment member for the second bayonet lock, the invention offers the additional advantage of making it impossible to engage the second bayonet lock without a filter cartridge in the filter casing 12, thereby preventing the inadvertent installation of the filter subassembly without a filter cartridge.

As in the case of the first bayonet lock, the socket members 12a of the second bayonet lock are in the form of four elongated arcuate members which serve to center the cap 10 by cooperating with the inner side of it cylindrical outer wall portion.

FIG. 12 shows that, when the filter subassembly is installed in the socket ring 13 and both bayonet locks are engaged, the insertion members 10a and the end face 10g of the second bayonet lock bear against the outer face 17 of the socket ring 13, thereby providing a supplemental axial abutment for the second bayonet lock. Both bayonet locks have the same direction of angular engagement, being preferably right-handed.

Because the cap 10 renders the filter casing 12 inaccessible to the fingers of a hand, for the removal of the filter subassembly, the torque for the release of the first bayonet lock must be applied to the filter casing 12 through the intermediary of the cap 10 and the engaged second bayonet lock. In order to assure that the second bayonet lock remains engaged while this torque is applied, it is therefore necessary for the second bayonet lock to have a higher release resistance than the first bayonet lock.

Different release resistances for the two bayonet locks are obtained by choosing bayonet lock configurations in which the second bayonet lock has a higher axial preload than the first bayonet lock, or in which the detent ridge 12b of the second bayonet lock is higher than the detent ridge 13b of the first bayonet lock, so that a greater deformation and a correspondingly greater force is required to release of the second bayonet lock.

This feature of the novel cover assembly makes it possible to quickly and easily remove and reinstall the filter subassembly without tools. It provides quick access to a large opening in the wall of the fluid reservoir, for a visual check of the fluid level, or for the addition or removal of fluid from the reservoir.

Air which vents from the outside into the fluid reservoir enters the cover assembly through the four vent openings 15 of the cap 10. The air then moves into the annular space between the filter casing 12 and the filter cartridge 11, passing radially through the wall 11a of the latter, to enter the fluid reservoir through the central opening 19 of the interior flange 12i at the inner end of the filter casing 12.

It should be understood that the term bayonet lock, as used in connection with this invention, is meant to refer to an attachment configuration between a supporting part or socket part and a detachable part in which one—or preferably a plurality of circumferentially regularly spaced—socket members of the supporting part cooperate with a preferably equal number of circumferentially spaced insertion members of the detachable part in such a way that a locking engagement or attachment is obtained as the result of consecutive axial and angular engagement movements of the detachable part relative to the supporting part, and a disengagement or release is obtained as the result of angular and axial release movements executed in a reverse sequence.

In the axial engagement movement, the insertion members of the detachable part move axially past the socket members of the socket part, while being angularly aligned with insertion gaps between the socket members. In the angular engagement movement, the insertion members move into an axially captive engagement with the socket members.

A bayonet lock configuration may be arranged for a right-handed or left-handed angular engagement movement. A right-handed bayonet lock requires a clockwise angular engagement movement, as seen in the direction of the axial insertion movement.

The axially captive engagement between a socket member of the supporting part and an insertion member of the attachable part may either be the result of the socket member being confined between spaced axially oppositely located faces of the insertion member, or it may be the result of the insertion member being confined between spaced axially oppositely located faces of the socket member.

It should be understood, of course, that the foregoing disclosure describes only a preferred embodiment of the cover assembly of the invention and that it is intended to cover all changes and modifications of this example of the invention which fall within the scope of the appended claims.

I claim the following:

1. A vented cover assembly adapted for attachment to an aperture in a wall of a fluid reservoir, so as to close the aperture while allowing filtered air to pass into and out of the fluid reservoir, the cover assembly comprising in combination:

a socket ring adapted for clamping attachment to the edge of said aperture, the socket ring including a tubular wall portion defining a substantially cylindrical bore of a diameter which is smaller than the width of the aperture, the axis of said bore being oriented substantially perpendicular to the reservoir wall and defining a rotational center axis for the cover assembly;

a generally pot-shaped filter casing having a bottom wall and a adjoining substantially cylindrical side wall cooperating with the bore of the socket ring so as to be insertable therethrough and to extend to the inside of the fluid reservoir, with the bottom wall located at the inner axial end of the side wall;

first bayonet-type locking means defined between the socket ring and the filter casing, for the removable attachment of the filter caisng to the socket ring;

a removable cap at the axially outer end of the filter casing;

second bayonet-type locking means defined between the filter casing and the cap for the removable attachment of the cap to the filter casing; and a filter cartridge arranged inside the filter casing and positioned between the bottom wall of the filter casing and the removable cap, the filter cartridge having an air-permeable filter wall; and wherein the filter casing has in one of its walls a vent opening for the flow of air between the inside of the fluid reservoir and one side of the filter wall ofthe filter cartridge, and the cap has a vent opening for the flow of air between the outside of the fluid reservoir and the other side of said filter wall.

2. A vented cover assembly as defined in claim 1, wherein the filter cartridge is of annular shape, its filter wall being a substantially cylindrical wall extending substantially concentrically with the side wall of the filter casing;

the filter cartridge further includes an inner end disc at the inner axial extremity of the filter wall and an outer end disc of the outer extremity of the filter wall, the two end discs being of resiliently deformable material;

the bottom wall of the filter casing forms an inner sealing lip engaging the inner end disc of the filter cartridge, and the cap forms an outer sealing lip engaging the outer end disc of the filter cartridge; and the vent opening of the filter casing is arranged in the bottom wall of the filter casing, radially inside its inner sealing lip, and the vent opening of the cap is arranged radially outside its outer sealing lip.

3. A vented cover assembly as defined in claim 2, wherein the filter cartridge further includes, on the inside of its side wall, a plurality of positioning ribs having axially extending length portions which cooperate with the inner end disc of the filter cartridge to radially position the filter wall at a distance from said side wall.

4. A vented cover assembly as defined in claim 3, wherein the positioning ribs of the filter cartridge are of angular shape, including radially extending rib portions adjoining the bottom wall of the filter casing, so as to reinforce said wall.

5. A vented cover assembly as defined in claim 1 wherein the first bayonet-type locking means includes a plurality of angularly regularly spaced socket members on the tubular wall portion of the socket ring, the socket members being in the form of circumferentially aligned sectoral formations which protrude radially inwardly from said bore, each socket member having an axially facing seating portion;

the first bayonet-type locking means further includes a matching plurality of angularly regularly spaced insertion members on the side wall of the filter casing, the insertion members being in the form of circumferentially aligned sectoral formations which protrude radially outwardly from said side wall, each insertion member having an axially outwardly facing seating portion;

the socket members of the socket ring define insertion gaps between their sector formations through which the insertion members of the filter casing move axially past the socket members, when the filter casing is inserted through the socket ring; and the first locking means further includes means for axially abutting the filter casing against the socket ring in the insertion sense, in a position in which the insertion members of the filter casing are located axially inside of the socket members of the socket ring and the respective seating portions of the insertion members and of the socket members are in substantial axial alignment, for engagement against each other, under an engagement rotation of the filter casing relative to the socket ring.

6. A vented cover assembly as defined in claim 5, wherein
the socket ring includes an axially outwardly facing outer face; and
the means for axially abutting the filter casing against the socket ring includes a radially outwardly extending rim formation on the outer axial extremity of the filter casing, the rim formation abutting against the outer face of the socket ring.

7. A vented cover assembly as defined in claim 6, wherein
the tubular wall portion of the socket ring extends into the aperture in the wall of the fluid reservoir, the socket members of the socket ring being located, in the axial sense, in the vicinity of a plane defined by said reservoir wall; and
a major portion of the axial extent of the filter casing is located on the inner side of the reservoir wall.

8. A vented cover assembly as defined in claim 5, wherein
each socket member includes, in angular succession in the sense of engagement rotation, an axially inwardly facing ramp portion and a detent ridge at the high end of the ramp portion adjoined by said seating portion, the seating portion being axially recessed from the detent ridge.

9. A vented cover assembly as defined in claim 8, wherein
the first locking means further includes an engagement stop for angularly positioning the filter casing relative to the socket ring in a position in which said seating portions are engaged against each other, the engagement stop being in the form of an axially inwardly extending protrusion on at least one of the socket member of the socket ring, arranged to rotationally abut against an insertion member of the filter casing in said engaged position.

10. A vented cover assembly as defined in claim 1, wherein
the second bayonet-type locking means includes a plurality of angularly spaced socket members on the side wall of the filter casing, near its out axial extremity, the socket members being in the form of circumferentially aligned sectoral formations which protrude radially outwardly from said side wall, each socket member having an axially inwardly facing seating portion;
the removable cap includes, at a diameter which is larger than the diameter of the filter casing, a substantially cylindrical wall portion with an end face which is oriented axially inwardly;
the second bayonet-type locking means further includes a matching plurality of angularly regularly spaced insertion members on the cylindrical wall portion of the cap, the insertion members being in the form of circumferentially aligned sectoral formations which protrude radially inwardly from said wall portion, each insertion member having an axially outwardly facing seating portion;
the socket members of the filter casing define insertion gaps between their sectoral formations through which the insertion members of the cap move axially past the socket members, when the cap is inserted over the filter casing; and
the second locking means further includes means for axially abutting the cap against the filter casing in the insertion sense, in a position in which the insertion members of the cap are located axially inside of the socket members of the filter casing and the respective seating portions of the insertion members and of the socket members are in substantial axial alignment, for engagement against each other, under an engagement rotation of the cap relative to the filter casing.

11. A vented cover assembly as defined in claim 10, wherein
the filter cartridge is arranged to be axially clamped between the bottom wall of the filter casing and the cap, thereby serving as the means for axially abutting the cap against the filter casing.

12. A vented cover assembly as defined in claim 10, wherein
each socket member includes, in angular succession in the sense of engagement rotation, an axially inwardly facing ramp portion and a detent ridge at the high end of the ramp portion adjoined by said seating portion, the seating portion being axially recessed from the detent ridge.

13. A vented cover assembly as defined in claim 12, wherein
the second locking means further includes an engagement stop for angularly positioning the cap relative to the filter casing in a position in which said seating portions are engaged against each other, the engagement stop being in the form of axially inwardly extending protrusions on the socket members of the filter casing, arranged to rotationally abut against the insertion members of the cap in said engaged position.

14. A vented cover assembly as defined in claim 13, wherein
the socket members of the filter casing form a sectorally interrupted rim at the outer extremity of the filter casing, the interruptions serving as said insertion gaps;
the socket ring includes an axially outwardly facing outer face; and
the axial extent of said protrusions of the engagement stop beyond the seating portions of the socket members of filter casing is slightly less than the axial width of the insertion members of the cap, so that, in the engaged position of the second bayonet locking means, the insertion members abut against the outer face of the socket ring, thereby also serving as said means for abutting the cap against the filter housing.

15. A vented cover assembly as defined in claim 1, wherein
both bayonet-type locking means are arranged for rotational engagement in the same rotational sense; and
the second bayonet-type locking means has a higher resistance against rotational disengagement than the first bayonet-type locking means, so that the application of a disengagement torque to the cap will disengage the first bayonet-type locking means, thereby permitting the removal of the filter casing and cap, with the enclosed filter cartridge, as a subassembly, from the socket ring.

* * * * *